United States Patent
Stern

[11] 3,740,122
[45] June 19, 1973

[54] ANTIGLARE MIRROR ATTACHMENTS
[75] Inventor: David Stern, Slough, England
[73] Assignee: Combined Optical Industries Limited, Slough, England
[22] Filed: Feb. 12, 1971
[21] Appl. No.: 105,832

[30] Foreign Application Priority Data
Jan. 23, 1970 Great Britain.................... 3,437/70

[52] U.S. Cl.............................. 350/281, 350/292
[51] Int. Cl............................ B60r 1/04, G02b 5/08
[58] Field of Search ......................350/279–281, 292

[56] References Cited
UNITED STATES PATENTS

| | | | |
|---|---|---|---|
| 1,949,138 | 2/1934 | Bell | 350/281 |
| 2,910,915 | 11/1959 | Harris | 350/280 |
| 2,669,159 | 2/1954 | Rogers | 350/281 |
| 3,254,556 | 6/1966 | Staunton | 350/168 |
| 3,293,982 | 12/1966 | Appeldorn | 350/211 UX |
| 3,561,848 | 2/1971 | Cunningham | 350/281 |

FOREIGN PATENTS OR APPLICATIONS
736,382   9/1955   Great Britain..................... 350/282

Primary Examiner—John K. Corbin
Attorney—Shoemaker & Mattare

[57] ABSTRACT

A rear view driving mirror comprises a mirror body having two reflecting surfaces of different reflective powers and angled to one another so that one will reflect incident light in one direction and one in another direction whereby a driver can select an image of high or low intensity dependent on the conditions, the body having integral hinge means engaging hinge means of a carrier, a retainer being provided to hold the mirror in a selected one of two positions relative to the carrier.

6 Claims, 5 Drawing Figures

PATENTED JUN 19 1973
3,740,122
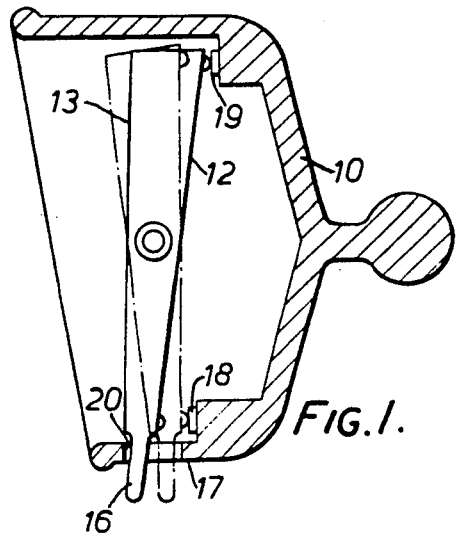
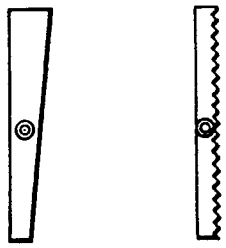
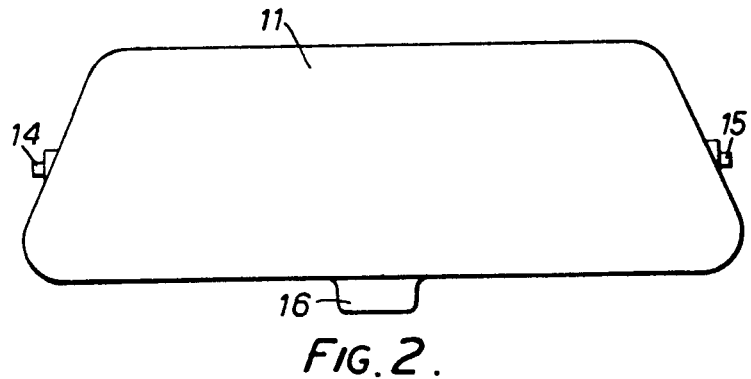
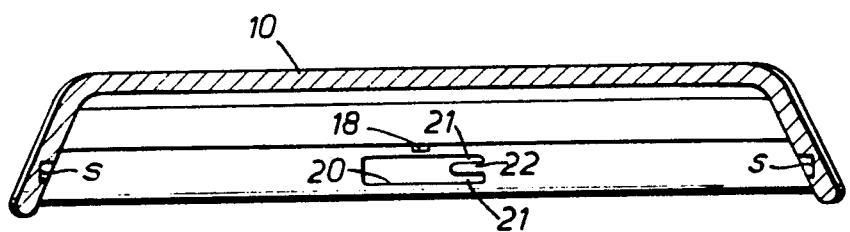
INVENTOR
DAVID STERN
BY
Shoemaker and Mattare
ATTORNEYS

ANTIGLARE MIRROR ATTACHMENTS

The invention relates to rear view mirrors, such as are fitted in motor vehicles, and which have two reflective surfaces, one of which produces an image of greater intensity than the other, the image of greater intensity being applicable for day time usage, and the dimmer image being applicable to avoid dazzle at night.

A variety of proposals have been put forward for such mirrors, all of which include a glass mirror body of wedge shaped cross section. This body is coupled to a member pivotable relative to a casing and a device is provided to hold the mirror relative to the casing.

Some of these constructions comprise a number of individual parts requiring manufacture and then assembly and it is an object of this invention to provide a simplified construction while retaining an adequately positive location of the mirror element in the two respective positions.

According to the present invention there is provided a rear view mirror for a vehicle comprising a mirror element moulded of synthetic plastics material, the element including a given reflecting surface of a first reflecting power and a different surface of a second reflecting power at an angle to the first surface, hinge means integral with the mirror element, and a mirror housing having hinge means engaged by the mirror hinge means to couple the mirror element and housing together and retaining means engageable by the mirror element to hold the mirror element in either one of two positions relative to the housing.

In order that the invention may be well understood there will now be described some embodiments thereof, given by way of example only, reference being had to the accompanying drawings in which:

FIG. 1 is a sectional view,

FIG. 2 is a rear plan view of a mirror element,

FIGS. 3 and 4 are alternative end views of the mirror element shown in FIG. 2, and FIG. 5 is a section through a mirror housing showing another embodiment of the invention.

As shown in FIG. 1 the mirror assembly has a housing 10 which at its ends has two opposed sockets S (see FIG. 5), arranged to receive trunnions outstanding from a mirror element 11. The mirror element 11 is shaped, and has a first surface 12 having a metallic coating and a second surface 13 being plain so as to produce a reflected image of less intensity than that produced by the first surface 12. The mirror element 11 is arranged to pivot on the trunnions 14, 15 which engage the sockets in the housing 10, so that during daylight the driver of a vehicle to which the mirror is attached may view the rear by means of surface 12, and at night by means of surface 13. Thus the driver may choose between an image of greater intensity during daylight, and sees a dimmer image at night.

At the lower edge of the mirror element 11, there is an operating tab 16, by which the mirror element 11 can be rocked between two positions. The operating tab 16 projects through a slot 17 in the base of the mirror housing 10, and there are two pairs of magnetic elements 19 and 18 at the upper and lower edges of the mirror element and housing to retain the mirror element 11 in each of the two positions. The magnetic element can be moulded into the mirror housing 10 and element 11 during their manufacture.

The mirror is moulded of transparent plastic material, preferably a methacrylate, the trunnions 14, 15 and tab 16 being integral parts of the moulding, and may have the transverse cross-section shown in FIGS. 1 and 3, or alternatively a transverse cross-section as illustrated diagrammatically in FIG. 4. The mirror element 11 shown in FIGS. 1 and 3 is wedge-shaped to give the required angle between the two reflecting surfaces of the mirror, but the mirror element shown in FIG. 4 has a plain second reflective surface and a first reflective surface comprising prisms arranged in a plurality of rows extending parallel with the longitudinal axis of the trunnions, the arrangement being such that the first reflective surface 12 is made up of a part of each of a plurality of prisms. The upper side of each prism (as shown) is the equivalent of a strip of the planar first surface of the mirror element of FIG. 3. All these upper parts are, however, equidistant from the second surface, whereby the moulding of a wedge section is avoided and moulding of a V-section channel is substituted in a mirror element of constant thickness.

It will be appreciated that the invention is equally applicable to mirror elements according to the drawings, FIGS. 3 and 4.

Referring to FIG. 5, the housing is modified to include an aperture 20 which receives the operating tab 16. The lip of the aperture is provided adjacent one end with recesses 21 to define a resilient tongue 22 and the aperture and tongue are dimensioned relative to the operating tab so that the tab can be moved between and locked in the positions shown in the chain and broken lines of FIG. 1 which correspond to the two operating attitudes of the mirror element 11.

It will be seen that two very simple mirror contstructions are provided both of which have only one moving part.

I claim:

1. A rear view mirror for a vehicle, comprising a moulded, transparent, synthetic plastic, solid mirror element having a front surface and a rear surface, said mirror element having a substantially wedge-shaped transverse cross-section and top and bottom edges and opposite ends, outwardly projecting trunnions integrally moulded on the opposite ends of the mirror element, magnetic holding means integrally moulded into the mirror element adjacent the top and bottom edges thereof, respectively, operating tab means integrally moulded on the bottom edge of the mirror element and extending downwardly therefrom, a moulded, synthetic plastic mirror housing, socket means in opposite sides of said housing, said mirror element trunnions received in said socket means to couple the mirror element and housing together, a slot in a bottom portion of said housing, said operating tab of said mirror element received through said slot and extending beyond said housing for access exteriorly of the housing, and magnetic means in said housing in alignment with the magnetic means on said mirror element for cooperation therebetween to hold the mirror element in either of two operative, inclined positions thereof.

2. A rear view mirror according to claim 1 in which the mirror element is a moulding of a methacrylate.

3. A rear view mirror for a vehicle, comprising a moulded, transparent, synthetic plastic, solid mirror element having a front surface and a rear surface, said miror element having a substantially wedge-shaped transverse cross-section and top and bottom edges and opposte ends, outwardly projecting trunnions integrally moulded on the oppoite ends of the mirror element, operating tab means integrally moulded on the bottom edge of the mirror element and extending downwardly therefrom, a moulded, synthetic plastic mirror housing, socket means in opposite sides of said housing, said mirror element trunnions received in said socket means to couple the mirror element and housing together a slot in a bottom portion of said housing, said operating tab of said mirror element received through said slot and extending beyond said housing for access exteriorly of the housing, and an elongate tongue on said housing at one end of said slot and projecting into said slot toward the other end of the slot, said tongue resiliently engaging said operating tab to hold said tab and mirror element in either one of two operative, inclined positions thereof.

4. A rear view mirror for a vehicle, comprising a moulded, transparent, synthetic plastic, solid mirror element having a plain first reflective surface and a second reflective surface comprising prismatic elements, and top and bottom edges and opposite ends, outwardly projecting trunnions integrally moulded on the opposite ends of the mirror element, magnetic holding means integrally moulded into the mirror element adjacent the top and bottom edges thereof, respectively, operating tab means integrally moulded on the bottom edge of the mirror element and extending downwardly therefrom, a moulded synthetic plastic mirror housing, socket means in oppoite sides of said housing, said mirror element trunnions received in said socket means to couple the mirror element and housing together, a slot in a bottom portion of said housing, said operating tab of said mirror element received through said slot and extending beyond said housing for access exteriorly of the hosing, and magnetic means in said housing in alignment with the magnetic means on said mirror element for cooperation therebetween to hold the mirror element in either of two operative, inclined positions thereof.

5. A rear view mirror according to claim 4 in which the mirror element is a moulding of a methacrylate.

6. A rear view mirror for a vehicle, comprising a moulded, transparent, synthetic plastic, solid mirror element having a plain first reflective surface and a second reflective surface comprising prismatic elements, and top and bottom edges and oppoite ends, outwardly projecting trunnions integrally moulded on the opposite ends of the mirror element, operating tab means integrally moulded on the bottom edge of the mirror element and extending downwardly therefrom, a moulded, synthetic plastic mirror housing, socket means in opposite sides of said housing, said mirror element trunnions received in said socket means to couple the mirror element and housing together, a slot in a bottom porion of said housing, said operating tab of said mirror element received through said slot and extending beyond said housing for access exteriorly of the housing, and an elongate tongue on said housing at one end of said slot and projecting into said slot toward the other end of the slot, said tongue resiliently engaging said operating tab to hold said tab and mirror element in either one of two operative, inclined positions thereof.

* * * * *